July 17, 1962    E. BRITTON    3,044,916
COLLAR STIFFENER AND METHOD OF MAKING
Filed Dec. 29, 1959    2 Sheets-Sheet 1
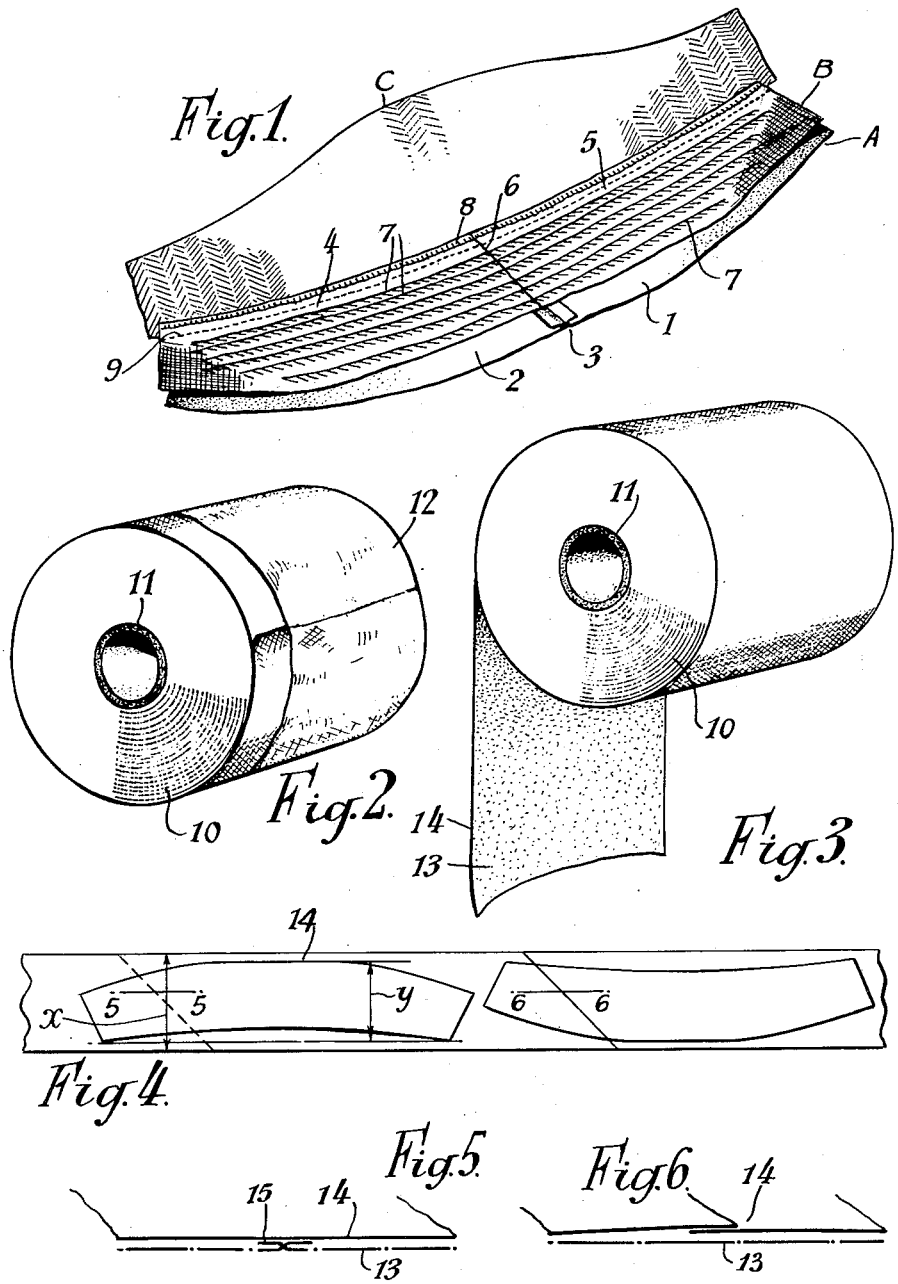
INVENTOR
ERIC BRITTON
BY Kenwood Ross
ATTORNEY July 17, 1962  E. BRITTON  3,044,916
COLLAR STIFFENER AND METHOD OF MAKING
Filed Dec. 29, 1959  2 Sheets-Sheet 2

INVENTOR.
ERIC BRITTON
BY Kenwood Ross
ATTORNEY.

3,044,916
COLLAR STIFFENER AND METHOD OF MAKING
Eric Britton, Macclesfield, England, assignor to Eric Britton & Company Limited, Macclesfield, England, a British company
Filed Dec. 29, 1959, Ser. No. 862,505
Claims priority, application Great Britain Dec. 30, 1958
3 Claims. (Cl. 154—46)

This invention provides novel stiffening materials for use by tailors and others in the manufacture of garments and the like. An important application of the invention is in the manufacture of the collars of coats and jackets, and the invention will be described as related to such use.

Hitherto, in the formation of a coat collar, the general practice has been for the under-collar to be composed of two pieces of fabric (usually a Melton cloth) stitched together end to end, and two pieces of a stiffening material or interlining also stitched together end to end, the joined stiffener or interlining being attached to the inner face of the joined under-collar by rows of blind stitching.

Compared with the general stream of production in a modern tailoring factory, this method of making up the collars is unduly complex, calling for a disproportionate amount of time and labour. It is therefore the principal object of the present invention to simplify the collar production, not only to reduce costs but also to avoid anything in the nature of a bottle-neck in a fully streamlined or mechanised factory system.

As will be appreciated from the following description, the present invention eliminates the necessity for cutting out and joining together separate pieces of an under-collar and for cutting out and joining together the separate pieces of an interlining, and also avoids the use of a blind stitching machine, a type of machine which calls for very careful adjustment and skilful use.

A proposal has already been put forward for production of a compound fabric for use in the manufacture of collars for outer garments, according to which a non-extensible closely-woven fabric cut on the straight and treated on one surface with an aqueous dispersion of rubber was combined with a woven stiffening material such as canvas or the like cut on the "bias" and which also could be treated upon one surface with an aqueous dispersion of rubber, the fabric and stiffening material being brought together under pressure to cause them to securely adhere together and so that there was an angular relationship between the threads of the respective layers. Such proposal, so far as we know, has never been taken up industrially.

I have found that a composite material for the purpose stated needs to be so made as to have a natural tendency to curl in a direction which leaves the Melton or other under-collar at the concave side. Such a tendency, predominant when the material is under tension, allows of the collars being given automatically a curl which hitherto has had to be built into individual collars by the machinist whilst their component parts are being assembled by the feeding of the stiffening layer to the blind-stitching machine at a slightly faster rate than the Melton or equivalent material. With the present invention, not only has a more uniform curl obtained than has been possible hitherto but, as the said blind-stitch operation is eliminated, the need for skill or craft on the part of an operator to produce the curling tendency is avoided.

The present improvements comprise a composite textile material suitable for use in the stiffening of the collars of garments, including an under-collar layer and a stiffening layer both cut on the bias and bonded to each other, and in which the yarns in at least one of said layers are so chosen, and the layers are in such mutual association that longitudinal tension imparted to a length or strip of the composite material produces a curvature transversely of said length or strip with the under-collar layer at the concave side.

The said choice of yarns for producing the transverse curvature is made on the basis of direction of twist in the yarns. If in the weaving of the fabric a Z twist yarn is used for the warp (or weft) and an S twist yarn is used for the weft (or warp) then, when such fabric is cut on the bias and pulled longitudinally it will assume a pronounced transverse curvature, in the same direction at all points in its length. On the other hand, if the warp and weft yarns have the same direction of twist, whether Z or S, when the fabric is bias cut and pulled no transverse curvature or only a very slight unimportant curvature will result.

The invention may therefore be characterised in that in at least one of the two said layers, the direction of twist in the warp yarns is opposite that in the weft yarns so as to produce the said transverse curvature.

The extent of curvature may be varied to some extent, if necessary, by varying the relative degree of twist (turns per inch) in one or both of the two yarns, but this will not usually be necessary.

If, in any applications of the invention, either of the fabrics used has a right and wrong side, the opposite directions of twist of the warp and weft yarn will be allocated so as to ensure that the eventual curvature will present the right side of the Melton or other undercollar fabric at the concave curvature of the composite material.

The invention may be further characterised by the reeling of the composite material under a slight tension (so as to induce the said curl when unreeled) the reeling being effected with the stiffening layer outermost. With such an arrangement, when the composite strip material is unreeled, it has two curling tendencies, one transversely of the strip due to the said selection of yarns and the other longitudinally of the strip due to its curvature is the reel.

For the manufacture of coat collars, which will be the principal use of the invention as at present contemplated, the composite unitary material will usually be provided in roll form, of a width only slightly greater than the overall width of a collar, thus allowing the cutting out of consecutive blanks in repeated end to end disposition to reduce waste. A convenient width of strip, by way of example is 4½" or thereabouts. The Melton cloth or the like will be of a colour and kind suited to the kind of material of which the garment is to be made, and the stiffening layer may be white or black or of other colour, as may be desired.

For quantity production, the improved composite material may be made first in a web form for example 40" or 45" wide, and will then be slit into strips of the required width. The several strips will then be rolled, usually on a tubular support or core, and surrounded by a paper or other enclosing wrapping.

Bias fabrics may be seamless, as when cut in a helical strip from a seamless woven tubular fabric, or they may be seamed as when a flat woven fabric is cut diagonally at successive points to produce end to end sections and these sections are re-joined together at their sides, leaving their original ends as the sides of the new strip.

In the former case, no difficulty arises with the stiffening layer as the direction of transverse curvature is constant throughout the length of the strip and, in assembling the two layers of the composite material, it only remains to ensure that direction of curvature is the same in each. In the other case however, where successive sections are sewn together, it is necessary that the free edges of the seam be on that side of the strip which is not apparent when the two layers are bonded together. Accordingly, having determined by test in which direction the bias cut material will curl transversely, the convex side of the curve must be regarded as the face side or right side of the fabric to lie against the underside of the collar proper. Therefore, in the said re-joining of the cut sections together, care must be taken that each such section about to be joined overlies the preceding section face side to face side so that, when one section is eventually turned over to bring the seam edges on the one face, the face sides of the two sections are both in the outer or convex side of the strip. For ease of manipulation at the sewing machine, it may be necessary to select the direction of the said diagonal cutting of the flat woven cloth as between left-to-right upwards and right-to-left upwards, in dependence on the direction of the natural curvature in the eventual bias strip.

The adhesive for bonding the two layers may be applied to either or both fabrics before they are brought together and may be of a thermo-plastic material not adhesive until heated, so as to allow of storage of the individual layers in roll form. In such case, heat and pressure will be used to effect the adhesion when the two layers are brought together, with or without the application of a plasticiser. In other cases, the adhesive will be applied to one or other of the two layers, usually the stiffener layer, by spreading or spraying or the like immediately before the two layers are brought together, and here also heat and pressure may be used if necessary to complete the bonding process.

The invention may include the feature that the reeled composite strip is wound on a core large enough to avoid undue variation between the longitudinal curl at the inner and outer layers of the reel, but this is not essential.

The improved composite strip material has a natural tendency to shape itself to the shoulders of the garment when incorporated into a collar, and eliminates the need for the special skill which has hitherto been requisite in the combining of an under-collar with a stiffening layer. Accordingly, the invention provides also a method of making garment collars wherein stiffened under-collars are cut successively from a strip of material only slightly wider than a collar, such strip having been cut from the above-defined composite material and comprising a bias-cut layer of Melton cloth or the like bonded to a bias cut layer of woven stiffening material and having a tendency to transverse curvature with the Melton cloth or the like at the concave face, the composite strip at the time of cutting being taken from a roll in which it has been stored under a tension sufficient to initiate such curvature.

The invention will now be described with reference to the accompanying drawings, wherein:

FIG. 1 is a perspective view of a partly made-up collar as generally obtaining in the prior art;

FIG. 2 is a perspective view of a roll of the improved composite material as it would be offered for sale in the normal way;

FIG. 3 is a perspective view of the roll of material partly unwound to show the natural tendency of the material to curve transversely;

FIG. 4 is a plan view, to a smaller scale, of a length of the unrolled material showing how the successive collar blanks are cut out;

FIG. 5 is a diagrammatic enlarged sectional view on the line 5—5 of FIG. 4;

FIG. 6 is a similar view taken on the line 6—6 of FIG. 4;

Figure 7:
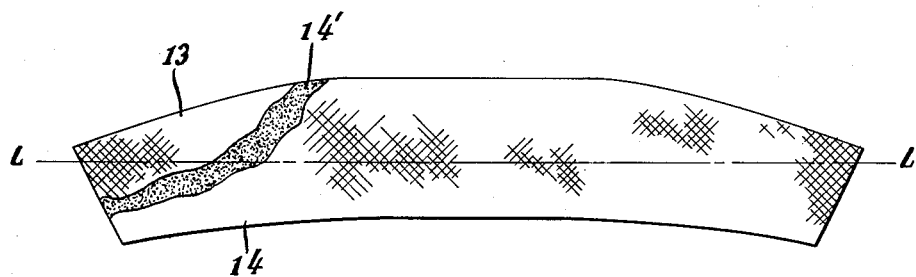
FIG. 7 is a plan view of a collar blank formed in accordance with the invention with portions broken away for purposes of clarity.

Referring first to FIG. 1, which illustrates the prior art, the under-collar A is made up of two pieces of material 1, 2, stitched together along the transverse line 3, and the stiffening layer B is made up of two pieces of material 4, 5 stitched together along the transverse line 6. These two jointed sections A and B are laminated together by rows of blind stitching 7. The face or top C of the collar is entered between the layers A and B along one edge of the lamination and the whole assembly is stitched through by the line of whipping stitching 8, the layers A and B additionally being stitched through by the line of plain stitching 9.

It will be seen that the building up of the collar according to this known mode of procedure is a lengthy and intricate process, and this is further complicated by the fact that, in stitching the parts A and B together, the one layer must be fed to the blind stitching machine rather more quickly than the other so as to give the final assembly a tendency to curl. All these difficulties are eliminated with the use of the present invention which will now be described.

In FIG. 2, there is shown a roll 10 of the improved composite material, this being wound on a card or like tubular core 11 and protected outwardly by a paper sheath or shield 12. It is proposed that suppliers should carry a stock of these made-up rolls, of varying widths corresponding to the normal variations of width in the collars of garments, and in various colours to suit the normal range of colours used in fabrics for making coats, jackets, and the like.

The improved composite material comprises a layer 13 of a Melton cloth or the like, cut on the bias, and a layer 14 of a stiffening material for example a plastic-impregnated canvas material, also cut on the bias the impregnant being thermo-plastic so that when the two layers are brought together and passed between heated rollers they can be made to adhere over their whole surface. The Melton cloth provides the outer face of the under-collar visible in the garment, whereas the stiffening layer is eventually concealed between the under-collar and the collar proper.

As explained above, the twist of yarn in the fabrics from which these materials are made is selected so as to differ in direction as between warp and weft, so that when a strip of the fabric is pulled longitudinally it will curl transversely. The two layers, when brought together, are disposed in such a way that their tendency to curl is in the same direction and presents the Melton cloth on the concave side of the curvature.

The composite material will first be made in web form and then cut into strips of appropriate width, each strip being reeled under a slight tension which imparts a tendency towards transverse curvature so that, when the material is unreeled, as illustrated in FIG. 3, it adopts a slightly curved formation transversely as shown. The composite material is reeled with a stiffener layer 14 outwards. The reeling of the strip under tension also imparts a slight tendency towards longitudinal curvature, again with the Melton cloth at the concave side.

In using the invention, a strip of the composite material of appropriate width is unreeled and, with the use of a normal pattern, successive collar blanks are marked out in end-to-end relationship as shown in FIG. 4, ready for cutting out. The width $x$ of the composite strip is chosen so as to be only slightly greater than the overall width $y$ of the collar pattern (see FIG. 4) thus avoiding waste and also ensuring that throughout each collar there is the same degree of bias at all points, as well as all collars cut from the same strip having the same degree of bias. Furthermore, the direction and degree of transverse curvature is uniform over the length of each collar and in all collars cut from the same strip.

In FIG. 7 is shown a laminated structure comprising the Melton under-collar layer 13, stiffener layer 14, and an adhesive layer 14' sandwiched therebetween. The layers 13 and 14 are bias cut with respect to the longitudinal center line L of the blank wherefore the warp and the weft are disposed at an angle relative to said center line as shown. As aforesaid the stiffener layer 14 may alternatively be plastic impregnated, if desired.

Figure 8:
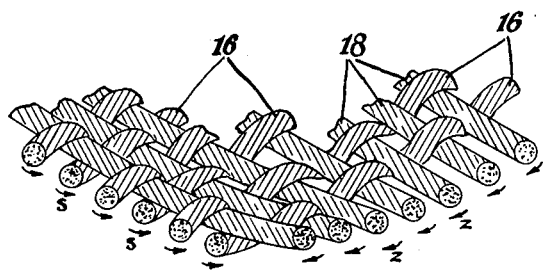
FIG. 8 is a greatly enlarged fragmentary perspective view of one of the fabric layers of the collar of FIG. 7 and showing warp and weft threads of opposite twists.

In FIG. 8, there is shown a greatly enlarged fragmentary perspective view of the warp and weft threads of either of the layers 13 or 14 of FIG. 7. It will be observed that the direction of twist of the warp threads 16, as indicated by the arrows S, is opposite to the direction of twist of the weft threads 18, as indicated by the arrows Z.

In making up a composite material according to one example, the Melton under-collar 13 comprises joined bias-cut segments arranged so that each segment has the same direction of curvature, and the seam edges 15 are so placed as to be concealed between the two layers of the strip, as shown in FIG. 5. With an adhesive or thermo-adhesive impregnated stiffener 14, the connection of the successive bias-cut segments by stitching is not always necessary as such connection may be effected by overlapping the edges of the adjoining segments and connecting them by their own adhesion as shown in FIG. 6.

In an alternative method of combining the stiffening layer and under-collar layer together, these two layers are fed between rollers with a sheet of a thermo-plastic material, for example an ethylene compound, between them, the rollers being heated so as to fuse the intermediate layer and cause it to bond the two outer layers together.

What I claim is:

1. A composite textile material for stiffening the collars of garments comprising, an under-collar layer and a stiffening layer bonded thereto, each of said layers being bias-cut wherefore the warp and weft threads thereof are angularly disposed relative to the longitudinal axis of the material, the direction of twist in the warp threads in at least one of the two said layers being opposite to the direction of twist in the weft threads thereof wherefore longitudinal tension imparted to a length of the composite material produces a curvature transversely of the said length with the under-collar layer at the concave side.

2. A material as set forth in claim 1 including a pressure and heat responsive plastic adhesive between said layers, with each said layer being of bias form by the cutting of a straight-cut length into sections with inclined ends and the joining of the sections together at their sides to form a bias-cut length and with the sections of said stiffening layer being joined by the overlapping of the sides and the plasticising of said adhesive, the direction of twist in the warp threads in the sections of at least one of said layers being opposite to the direction of twist in the weft threads in said sections, the sections of said under-collar layer being joined by stitching and the seam edges of such layer being located between the said layers.

3. A method of making garment collars wherein stiffened under-collars are cut successively from a strip of material slightly wider than the collar, such strip having been cut from a material comprising a bias-cut layer of Melton cloth bonded to a bias-cut layer of woven stiffening material, the direction of twist in the warp threads in at least one of the two said layers being opposite to the direction of twist in the weft threads thereof wherefore said strip has a tendency to transverse curvature with the Melton cloth at the concave face, the composite strip at the time of cutting being taken from a roll in which it has been stored under a tension sufficient to initiate such curvature.

References Cited in the file of this patent
UNITED STATES PATENTS

| | | |
|---|---|---|
| 1,254,339 | Morgan | Jan. 22, 1918 |
| 1,766,259 | Payne | June 24, 1930 |
| 1,995,187 | Lind et al. | Mar. 19, 1935 |
| 2,035,849 | Underwood | Mar. 31, 1936 |
| 2,100,201 | Quenelle | Nov. 23, 1937 |
| 2,400,276 | Whitman | May 14, 1946 |
| 2,500,911 | Cohn | Mar. 14, 1950 |